United States Patent
King et al.

(10) Patent No.: US 7,328,410 B2
(45) Date of Patent: Feb. 5, 2008

(54) COMPUTER ASSEMBLY

(75) Inventors: James Edward King, Wokingham (GB); Rhod James Jones, Crowthorne (GB)

(73) Assignee: Sun Microsystems, Inc., Santa Clara, CA (US)

( * ) Notice: Subject to any disclaimer, the term of this patent is extended or adjusted under 35 U.S.C. 154(b) by 820 days.

(21) Appl. No.: 10/643,810

(22) Filed: Aug. 19, 2003

(65) Prior Publication Data

US 2005/0041019 A1  Feb. 24, 2005

(51) Int. Cl.
*G06F 3/00* (2006.01)
(52) U.S. Cl. ........................... 715/771; 345/2.1
(58) Field of Classification Search ........... 715/771; 345/2.1
See application file for complete search history.

(56) References Cited

U.S. PATENT DOCUMENTS 6,266,721 B1 * 7/2001 Sheikh et al. ............... 710/100
6,445,970 B1  9/2002 Hedman et al.
6,493,827 B1 * 12/2002 Mueller et al. ............. 713/300

OTHER PUBLICATIONS

"RLX Looks To Channel for Future Blade Server Growth," Kovar, Joseph F., http://www.crn.com/sections/breakingnews/dailyarchives.jhtml?articled1=18829789 pp. 1-2, Feb. 19, 2003.
"HP Blade Server bh7800 Installation Guide," hp®, Hewlett-Packard, pp. i-65, copyright 2002, fourth version.

* cited by examiner

*Primary Examiner*—Kieu D. Vu
(74) *Attorney, Agent, or Firm*—Meyertons Hood Kivlin Kowert & Goetzel, P.C.; Rory D. Rankin

(57) ABSTRACT

A computer assembly for example for use as a network server comprises housing a host processor located within the housing and, a service processor also located within the housing for providing system management functions within the computer assembly. The housing includes a display that is located thereon for displaying the status of components of the assembly obtained from the service processor, and one or more manual switches located on the housing for enabling a user to vary information displayed by the display and/or to alter the status of the equipment. The computer assembly may include a console interface that communicates with the service processor to enable the system management functions of the assembly to be monitored and/or the status thereof to be modified from a remote console connected thereto in addition to or instead of by the display and switches.

23 Claims, 5 Drawing Sheets

COMPUTER ASSEMBLY

BACKGROUND OF THE INVENTION

This invention relates to computer assemblies, and especially to computer assemblies that are employed as servers in data networks.

The assemblies may for instance be employed as servers for example in local area networks (LANS) or in wide area networks (WANs), telecommunications systems or other operations such as database management or as internet servers. Such servers may be used in so-called "horizontally scaled" applications in which tens or hundreds of corresponding servers are employed as part of a distributed system.

A typical computer employed for such purposes will comprise a pair of processors mounted on a motherboard, together with power supply units (PSUs), and other components such as hard disc drives (HDDS), fans, digital video disc (DVD) players, memory modules etc. One or more of the processors, the host processor(s), provides the main functions of the server, and may communicate with a number of peripheral components, including communication ports, optionally via peripheral component interconnect (PCI)bridges in order to provide server operation.

In addition to the host processor(s), the assembly may include another processor, called the service processor or the remote management controller (RMC), which provides management functions for the system assembly. Such functions may include environmental monitoring, temperature monitoring of the enclosure, fan speed control, monitoring of various components of the assembly such as DVDs, memory cards, PSUs and the like.

Such assemblies are often provided as rack-mounted systems, and are housed in data centres which contain a large number of rows of assemblies extending for scores or even up to a hundred meters. When one of the assemblies malfunctions, a service engineer is called out to repair the assembly, normally by quiescing the assembly, replacing the component if it is in the form of a field-replaceable unit (FRU), and then testing the component. The assemblies typically have a console interface that communicates with the service processor, and, in use, is connected to a console in the form of a personal computer located in the data centre so that the service engineer can log on to the console and obtain access to the relevant assembly. This operation can, however, take a significant amount of time. The service engineer will typically go to the remote console to diagnose the problem, walk to the assembly to repair the malfunction, and return to the console to verify the repair. For many service procedures this may involve repeating this operation a number of times, requiring the service engineer to walk hundreds of meters between the electronics assembly and the console. It would be possible for the service engineer to reduce the time taken for such a repair for example by taking a laptop computer with him to the relevant assembly for diagnostic purposes rather than returning to the console. However, the physical layout of such data centres is such that it is not easy or convenient to use a laptop at the racks of assemblies. Furthermore, operators of the data centres are understandably reluctant to allow individuals to bring computers into the building if they are then going to operate on the servers, in view of the sensitivity of the data held by the network and the possible damage to the network caused either by unauthorized reconfiguration of the network or by the introduction of a virus. Accordingly, it is desired that all servicing or repair operations be conducted employing only computer equipment that is owned by the network operators.

SUMMARY OF THE INVENTION

According to one aspect of the present invention, there is provided a computer assembly which comprises:
  (i) a housing;
  (ii) a host processor located within the housing;
  (iii) a service processor located within the housing for providing system management functions within the computer assembly;
  (iv) a display that is located on the housing for displaying the status of components of the assembly obtained from the service processor; and
  (v) one or more manual switches located on the housing for enabling a user to vary information displayed by the display and/or to alter the status of at least one of the components.

Thus, according to this aspect of the invention, the service engineer can obtain diagnostic information on the assembly, and conduct testing of the assembly either before or after repair thereof as required simply by actuating the switches to read the relevant data from the display. It is thus possible for the service engineer to effect repair of the assembly without the need to walk to the console or at least to minimise the number of times it is necessary to walk to it.

At least in the broadest aspect of the invention, it is possible for all servicing operations to be effected at any time by accessing the electronics assembly. However, according to another aspect, the invention provides a computer assembly which comprises:
  (i) a housing,
  (ii) a host processor located within the housing;
  (iii) a service processor for providing system management functions within the computer system;
  (iv) a display that is located on the housing for displaying the status of components of the assembly obtained from the service processor;
  (v) one or more manual switches located on the housing for enabling a user to vary information displayed by the display and/or to alter the status of at least one of the components; and
  (vi) a console interface that communicates with the service processor to enable system management functions of the assembly to be monitored and/or the status thereof to be modified from a console connected thereto.

According to this aspect of the invention, the display and/or switches on the assembly housing can be enabled and/or disabled by means of signals sent thereto from the console interface, thereby enabling the console to determine which operations may be effected by the service engineer. For example, the service engineer may be allowed by the console to conduct routine service operations or to replace any component that has malfunctioned, but may not be allowed to conduct any other operations such as re-configuring the assembly.

Thus, according to another aspect, the invention provides a computer system, which comprises a plurality of computer assemblies, each of which comprises:
  (i) a housing;
  (ii) a host processor located within the housing;
  (iii) a service processor located within the housing for providing system management functions within the computer assembly;

(iv) a display that is located on the housing for displaying the status of components of the assembly obtained from the service processor; and (v) one or more manual switches located on the housing for enabling a user to vary information displayed by the display and/or to alter the status of at least one of the components;

the system including a console that can communicate with each of the assemblies and which can enable or disable the display and/or switches on any assembly either completely or in part.

Also, according to yet another aspect, the invention provides a method of operating a computer system comprising a plurality of computer assemblies, each of which comprises:

(i) a housing;

(ii) a host processor located within the housing;

(iii) a service processor located within the housing for providing system management functions within the computer assembly;

(iv) a housing that encloses the computer assembly;

(v) a display that is located on the housing for displaying the status of components of the assembly obtained from the service processor;

(vi) one or more manual switches located on the housing for enabling a user to vary information displayed by the display and/or to alter the status of at least one of the components; and (vi) a console that can communicate with each of the assemblies and which can enable or disable the display and/or switches on any assembly either completely or in part;

which method comprises enabling the display and/or switches of an assembly that includes a component that has malfunctioned in order to allow the component to be repaired or replaced and to be tested, and then disabling the display and/or switches when the repair or replacement has been effected.

BRIEF DESCRIPTION OF THE DRAWINGS

Embodiments of the present invention will now be described in detail by way of example with reference to the accompanying drawings, in which corresponding parts are given like reference numbers. In the drawings.

DESCRIPTION OF PARTICULAR EMBODIMENTS

Figure 1:
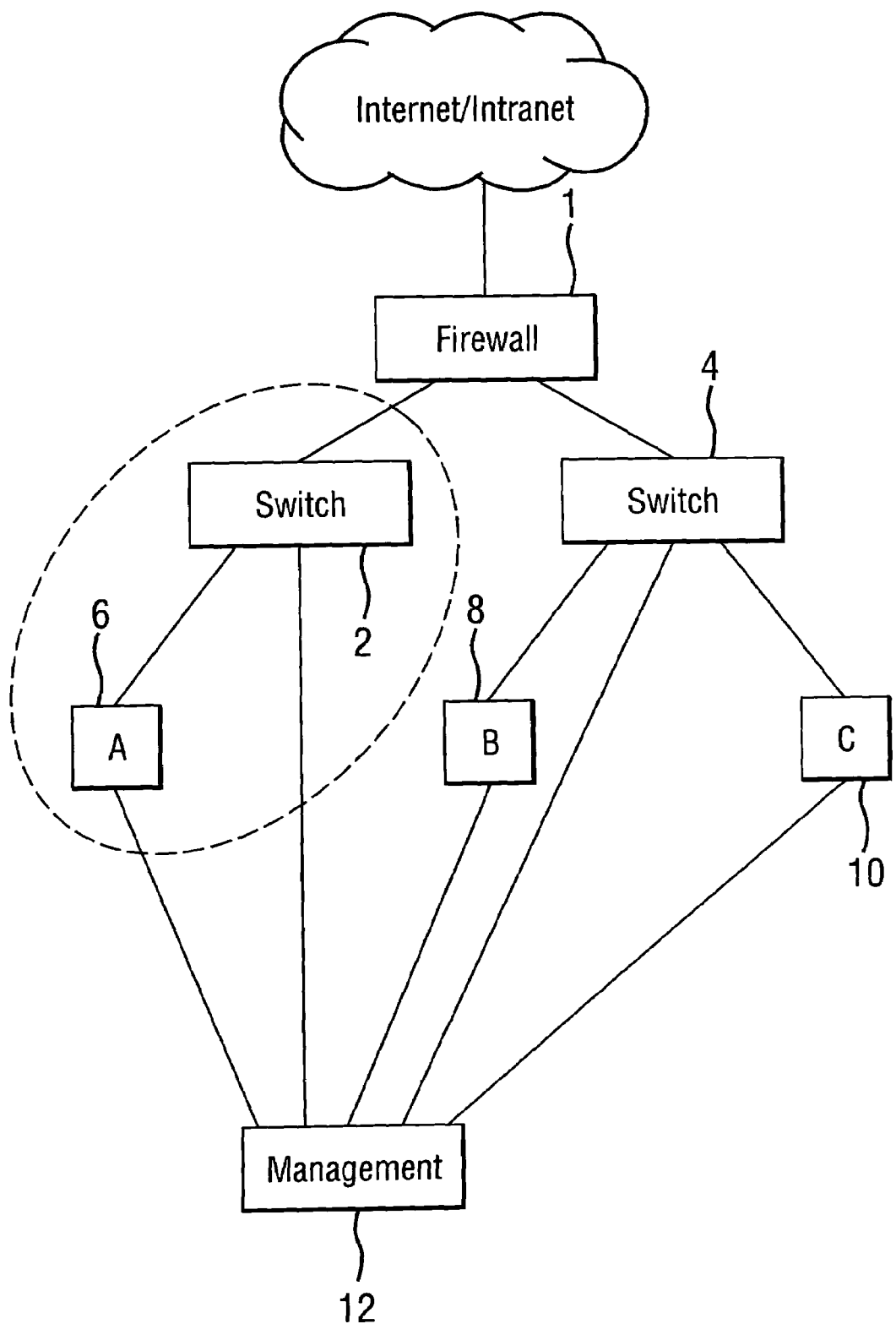
FIG. 1 is a schematic block diagram showing part of a network employing a number of electronics assemblies according to one embodiment of the present invention.

Referring now to the drawings, in which like reference numerals are used to designate corresponding elements, FIG. 1 shows part of a network in which one or more electronics assemblies according to one embodiment of the present invention may be employed. The network may for example be a local area network, or a wide area network and may be connected to other networks such as the internet. The network may comprise a firewall 1 for connection to the internet, for protecting the network from viruses and unauthorized access, and for load balancing of the network, switches 2 and 4 (there may be many such switches in any one network) and customer servers 6, 8 and 10. Thus, part of the network comprising server 6, part of switch 2 and part of the firewall 1 will form a network of customer A, while other parts of the network will form networks of customers B and C. All these networks will typically be housed in one data centre that is run by a separate management organisation 12 that will be able to access all parts of the network. Clearly, even though the networks of the different customers are physically located together, it is important that data flow is contained within the separate networks and is not allowed to cross between them inadvertently. The management organisation 12 will be in control of configuring and maintaining the network among other things, and it will normally be relatively insecure, relying on physical security of the building and systems in order to prevent inappropriate transfer of data.

Figure 2:
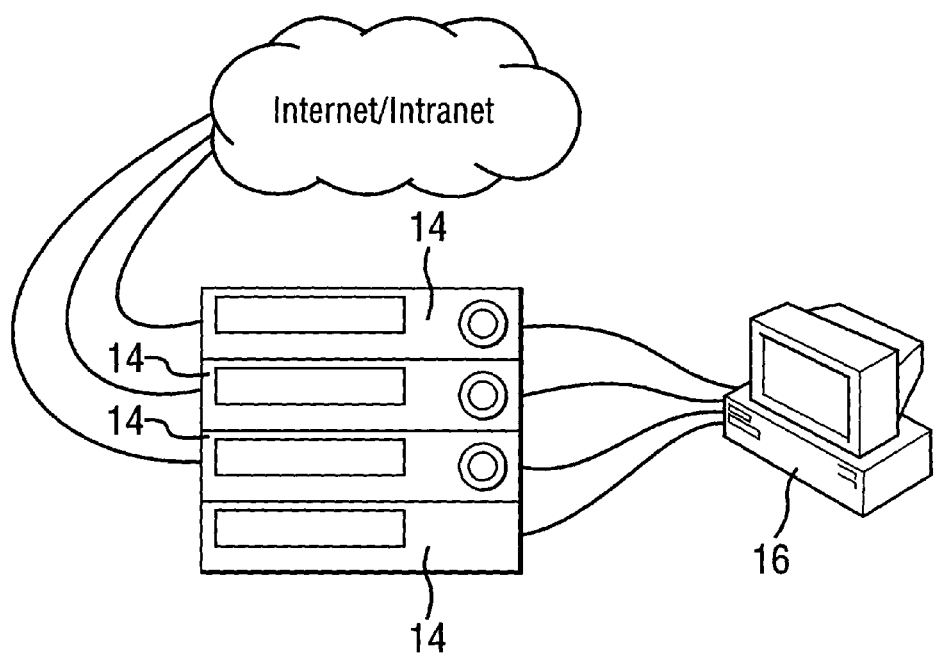
FIG. 2 is a schematic view of a number of assemblies forming a part of the network of FIG. 1.

FIG. 2 shows a number of electronics assemblies 14 according to this embodiment of the invention that provide servers for customers A, B and C in the network. The assemblies 14 may be stacked together in racks, for example nineteen inch, 23 inch or metric racks (only four are shown, but hundreds of such assemblies may be located in racks in a data centre) and may be connected to the switches 2 and 4, and to other parts of the network including a console 16 for controlling the management functions of the assemblies, that is to say, the configuration of the assemblies within the network, and managing the system functions of the assemblies.

Figure 3:
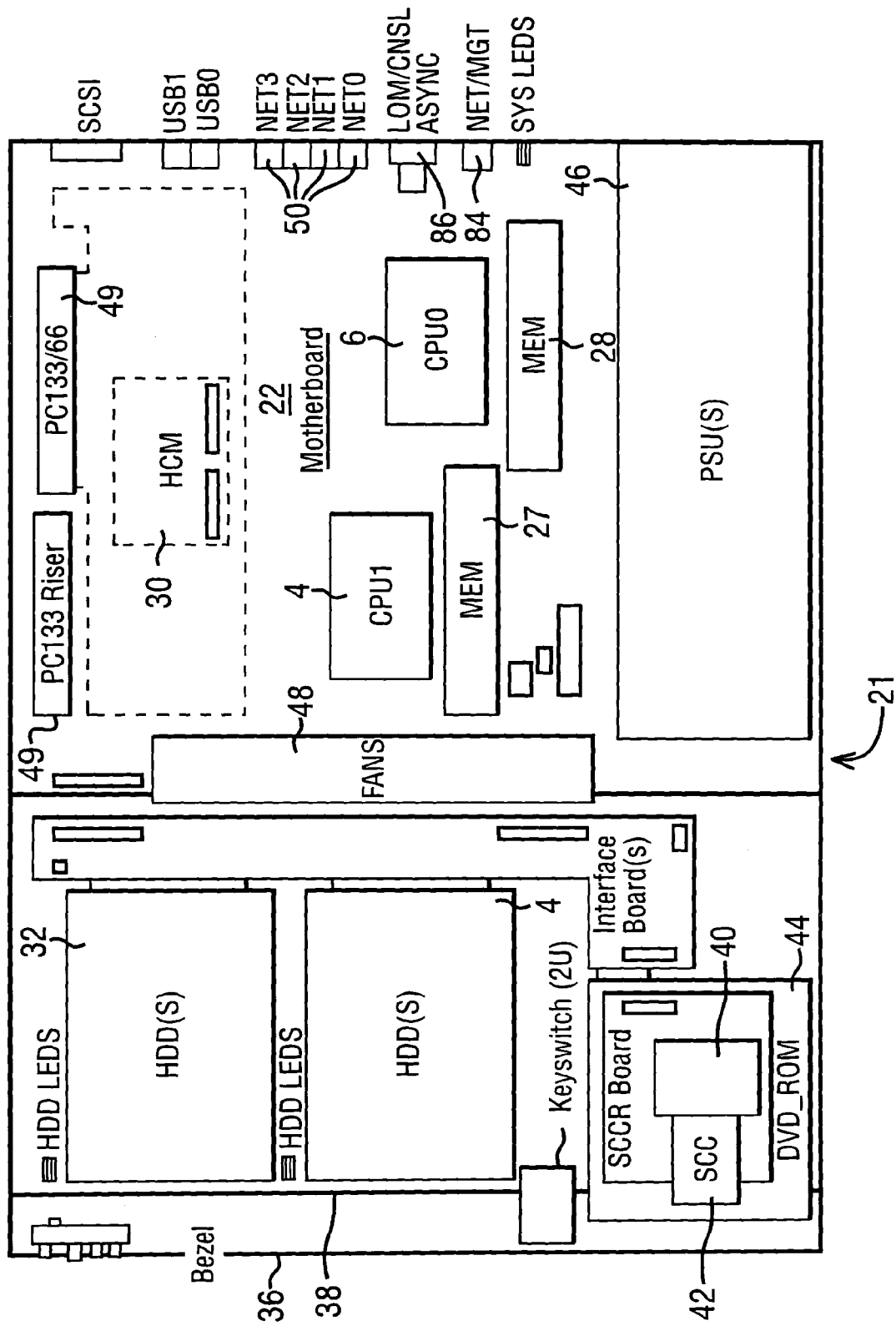
FIG. 3 is a schematic physical plan view of one form of computer assembly according to an embodiment of the present invention.

FIG. 3 shows a physical plan view of a typical narrow form factor computer that may provide a rack mounted server 14 in such a network.

The assembly may be designed to be a so-called high "RAS" system, that is to say, to have high reliability, availability and serviceability. As such, it is intended that the system will be operated with the minimum amount of down time, and indeed, such down time may be of the order of minutes per year.

The computer comprises an enclosure 21 that contains a motherboard 22 in the form of a printed circuit board (PCB) designed in a custom form-factor to fit the enclosure 21 and chosen to minimise the cabling within the enclosure. The motherboard 22 carries the majority of circuitry within the computer. On the motherboard are mounted one or (as shown here) two host processors or central processing units (CPUs) 24,26 each of which is provided with its own dedicated cooling in the form of an impingement fan that clips onto the CPU socket. Each processor 24, 26 may be provided with its own dedicated block of memory 27, 28 provided in the form of one or two banks of dual in-line memory modules (DIMMs) with a total of typically 256 MB to 16 GB block capacity.

A hardware cryptographic module (HCM) 30 may also be located on the motherboard. The HCM may be provided on a mezzanine card which plugs directly into the motherboard, and contains a co-processor providing cryptographic protocol acceleration support for security algorithms used in private community applications.

Two hard disc drives (HDDS) 32 and 34 are located at the front of the computer behind the front bezel 36. The drives are hot-pluggable and are accessible by removal of the bezel and EMI shield 38. Two internal HDDs plug directly into the motherboard via right-angled connectors located on the front edge of the motherboard 22.

Next to the HDDs may be arranged a system configuration card reader (SCCR) 40 that is able to read a system configuration card (SCC) 42 inserted therein. The SCC may contain all relevant information concerning the computer, so that it is possible to replace one computer with another simply by inserting the original SCC into the new computer and replacing the hard disc drives with those of the original computer.

A removable media drive bay may be provided to allow optional fitting of a slimline (notebook style) digital video disc or digital versatile disc (DVD) drive 44 for reading CD and DVD media. The media transport loader is accessible through a slot in the enclosure bezel 36.

One or two 320 W or 400 W custom power supply units (PSUs) 46 may also be provided. In addition to the dedicated CPU fans, the assembly can be cooled by means of a row of fans 28 mounted between the motherboard and the media drive bays.

The computer may support input/output (I/O) expansion by means of peripheral component interconnect (PCI) cards that plug into expansion slots. These are accommodated by means of riser cards 49 that plug directly into the motherboard 22.

A number of I/O interfaces and sockets 50 are provided along the rear surface of the enclosure 1.

Figure 4:
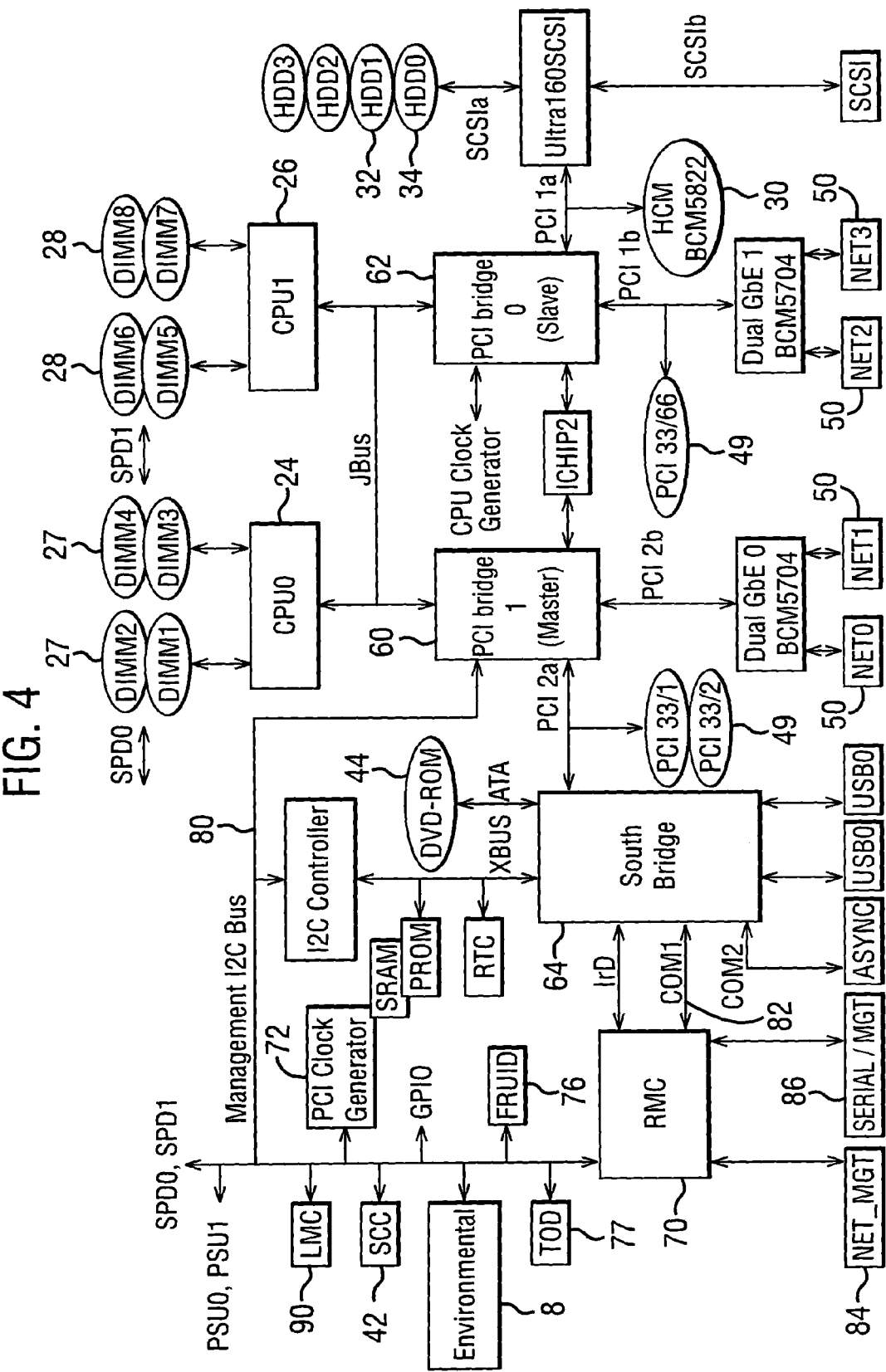
FIG. 4 is a schematic block diagram showing the system architecture of an electronics assembly according to an embodiment of the invention.

FIG. 4 is a schematic representation of the system architecture of the computer system according to the invention.

Two host processors or CPUs 24 and 26 have an integer execution unit, a floating point and graphics unit, 32 kB level 1 instruction cache, 64 kB level 1 data cache, 1 MB (256 k×32) level 2 data cache, a memory controller with error correction code (ECC) and a bus (JBUS) interface controller. Four DIMM sockets 27 and 28 are associated with each CPU.

The CPUs 24, 26 are connected in this configuration to two PCI bridges 60, 62 which provide interfaces to independent 64 bit PCI buses leading to various peripheral components such as the riser cards 49, HDDs 32 and 34, the HCM 30 etc. The PCI bridge 60 for CPU 24 is also connected to a PCI I/O device 64 referred to as "South Bridge". This is an integrated PCI sub system which provides an integrated drive electronics (IDE) controller, a universal serial bus (USB) controller, independent universal asynchronous receiver/transmitters (UARTs), XBUS bridge and a power management controller. The PCI I/O device 64 also provides the console interface for enabling user access to the host processors 24 and 26.

A service processor or remote management controller (RMC) 70 is included for providing local and remote management services for control of the server. Such management service functions may include but are not limited to:
1) power management control;
2) environmental monitoring;
3) enclosure management and event logging;
4) fan control;
5) voltage rail monitoring;
6) component status monitoring.

The service processor is also responsible for monitoring and reporting the operational status of the system. The processor typically operates from the +5V standby rail and is capable of power cycling and resetting of the host system, and has dedicated flash ROM and synchronous dynamic RAM (SDRAM).

Peripheral devices that are required for the management functions, may include, but are not limited to, the system configuration card reader (SCCR) 40, PCI clock generator 72, general purpose IO (GPIO) devices 74 field replaceable unit identification devices (FRUIDs) 76, a "time-of-day" real time clock 77, and a system temperature monitor 78. These devices are provided on an inter-integrated circuit (I2C) management bus 80. In addition to the flash ROM and SDRAM, the service controller can access electrically erasable programmable ROM (EEPROM) that is provided in the temperature monitor 78 via the I2C management bus 80.

As well as monitoring the environment and managing the peripheral devices, the service processor can communicate with the PCI I/O device or console interface COM1 serial port 82. User access to the service processor 70 from the console 16 is available either through an ethernet port 84 NET_MGT, or through an asynchronous serial port 86 SERIAL/MGT. In this way, remote user access is available either to the service processor 70 for management functions, or to the host processor(s) 24 and 26 via the service processor 70.

In addition to the other components, a local management centre (LMC) 90 may be connected to the I2C management bus 80 for accessing information regarding the status of the assembly and for altering the status thereof. The local management centre may be located physically in the assembly housing 21, for example in the front bezel 36.

Figure 6:
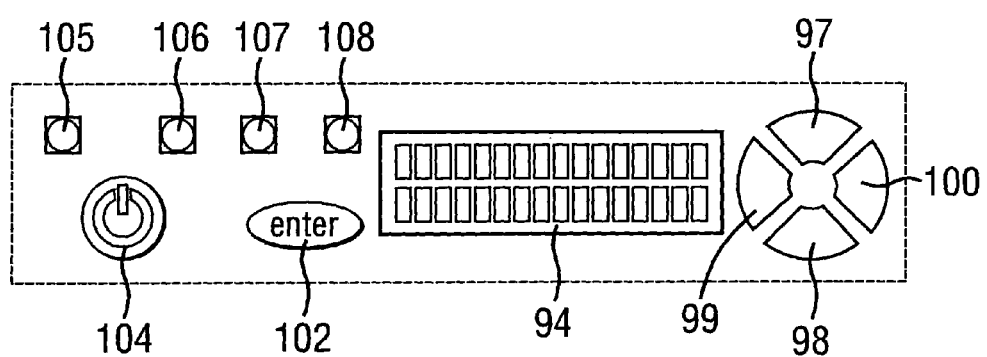
FIG. 6 is a schematic view of the front of one of the assemblies employed in the invention.
Figure 5:
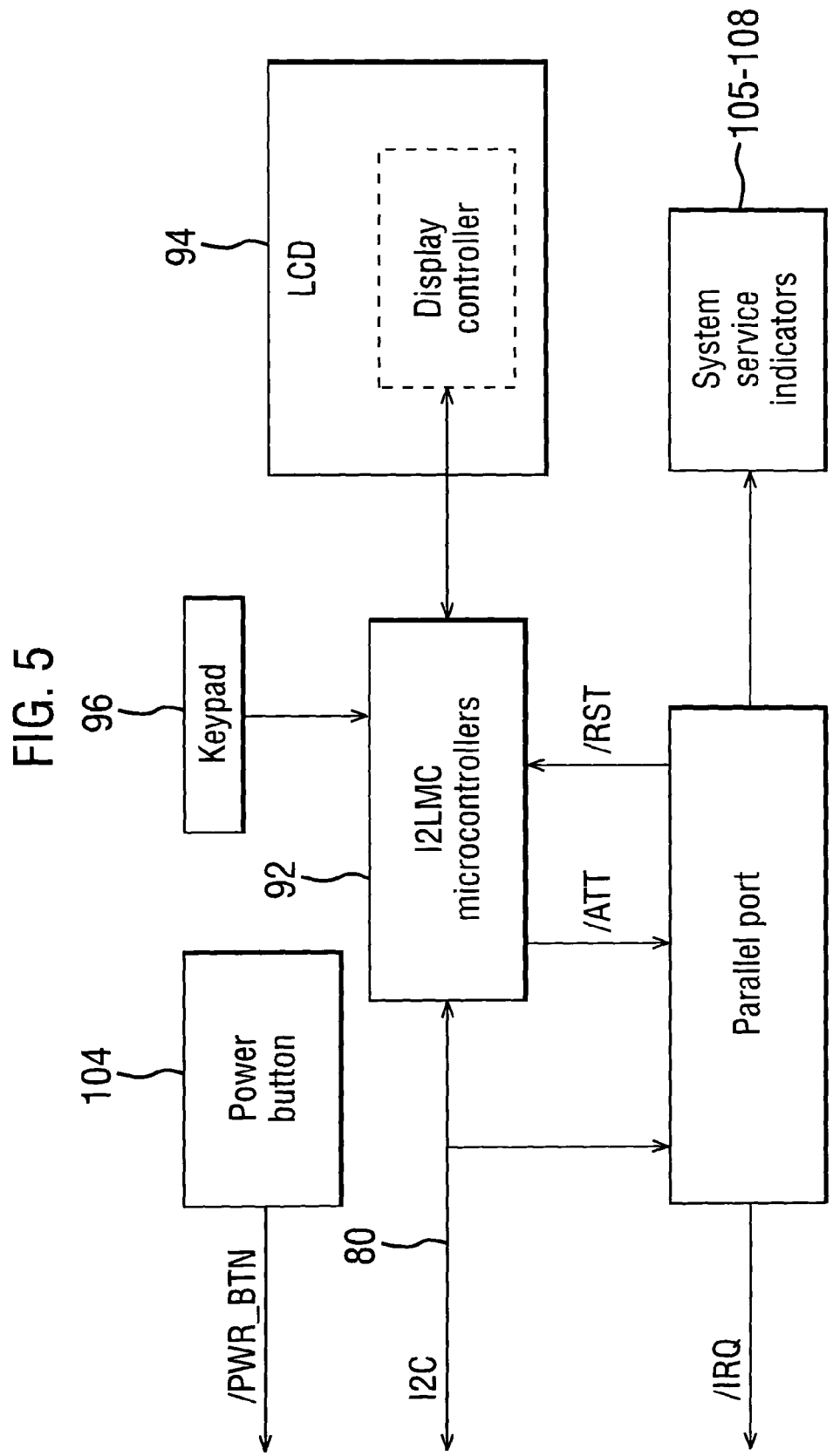
FIG. 5 is a detail taken from FIG. 2 showing components of the assembly housed in the front bezel thereof.

FIG. 5 shows the LMC 90 in greater detail. The LMC 90 comprises for example a microcontroller 92 that is connected to the I2C management bus and is also connected to display, for example a liquid crystal display (LCD) 94 and a number of switches 96 in the form of a keypad. FIG. 6 shows schematically how the LMC may be arranged in the front bezel 36 of the assembly housing.

The LMC 90 may have an alphanumeric LCD 94 which can be menu driven by means of "UP", "DOWN", "LEFT", "RIGHT" AND "ENTER" keys 97, 98, 99, 100 and 102 respectively, a power button 104 and four service indicator light emitting diodes (LEDs) 105, 106, 107 and 108. The LEDS 105 to 108 may be employed to indicate that the system is active, a service is required, the assembly is ready to be removed or any other state. The UP and DOWN keys may be employed to exit and enter various levels of the menu, while the LEFT and RIGHT keys enable scrolling of the menu items.

The alphanumeric LCD may be designed as a 16 column by 2 row display (although other sizes may be employed) which can operate in a number of modes:

1) Default Display Mode

This mode allows the display of system identification data. At the time of shipment, the default data should be the system serial number to allow ease of identification in the event of a "dead-on-arrival" (DOA). The user may then have the option to set the default display to various identifiers such as: managed system hostname, Service processor network interface internet protocol (IP) address, managed system serial number, managed system primary media access controller (MAC) address, or a customer defined ASCII string.

2) Service Event Default Mode

This mode allows the display to show that the system requires service attention, and may operate in conjunction with one of the LEDs, for example a "service required"

LED. The display 94 may indicate the nature of the event that has occurred, for example a failure of one of the components, and also the number of events.

3) Status Event Default Mode

This mode indicates the status of the assembly, for example when the operating system is running, booting, when it is undergoing self-testing or diagnostics or is on standby.

The LCD/keypad may enable an engineer to navigate through various menus in order to perform set tasks. Typical menus include:

1) Set Display Mode

This allows the user to select the default system identifier to be used in the default display mode.

2) View Event Log Mode

This menu allows the user to view previous service events and/or any changes in the status of the assembly. The log should contain all previous service events and or status changes.

3) Configure Mode

This menu shows and allows the user to enter parametric data, for example the configuration variables of the assembly, the hostname the internet protocol (IP) address subnet mask and the IP gateway of the assembly.

4) Test Mode

This menu allows the user to run a diagnostic test on the relevant component, e.g. a component that appears faulty or one that has just been replaced.

When Test Mode is selected, the up/down keys may be used to run through the list of available tests and the particular test may be selected by the enter key.

5) Exit

This menu exits the menu option and displays the default display.

Thus, as an example, when the service processor indicates that a service event has occurred, the display 94 will indicate the type of service event, and information identifying the event may be sent to the remote console 16 which will call out a service engineer. The engineer can then proceed to the relevant assembly, view the event and the service log on the display, perform any diagnostic testing, replace the component if it is a field-replaceable unit (FRU), repeat any diagnostic testing, and move on to the next job.

Thus, it is possible to perform routine servicing and maintenance without the need to connect or visit the console. Indeed, if all the severs are implemented in accordance with the invention the network administration can remove the consoles to a locked office, possibly remote from the datacentre, thereby improving security and reducing costs.

In addition, by appropriate design of the menu, it is possible to simplify the diagnosis of faults in the assembly, thereby reducing the skill level of the personnel required to service the assembly.

The LMC has the ability to allow a number of different activities to be performed on the assembly, some of which are non-invasive such as reading identification and status of the assembly, while others are highly invasive such as re-configuring the assembly or replacing and testing FRUs, and it may not be appropriate for all activities to be allowed all the time. According to one aspect of the present invention, the LMC 90 does not require authentication by password, and so, in view of this, the network system, comprising a number of such assemblies together with a console, may allow what can be described by authentication by proxy, that is to say, the system management may allow some, but not all, activities to be performed on the assembly by the LMC in some cases, and all activities to be performed in others, under authentication by the console 16 which will, typically, require access to be allowed using a password.

With such a system, the console 16 may communicate with each assembly and enable or disable the display 94 and keypad 96. Thus, it is possible for the system to operate under a number of options, for example:

Option 1—All Enabled

With this option, the console enables all features of the LCD/keypad to allow testing and re-configuration of the assembly/network system. This will typically occur when the assembly is commissioned and when major changes are made to the network system.

Option 2—All Disabled

With this option, no information can be obtained from the LCD, and access may be made to the assembly via the LMC 90.

Option 3—Partially Enabled

This option may be employed during normal operation of the network system. This option could, for example, enable non-invasive activities such as allowing the LMC 90 to operate in display mode and also, optionally, to display the service log when required, but to disable re-configuration and testing of the assembly.

Other options may also be available. For example, the system may be arranged so that when the console 16 is notified of a service event (malfunction of a component) by the service processor 70, or that a service interval has expired the console 16 will automatically enable the test mode of the LCD/keypad to allow certain service operations to be performed such as testing power down etc, optionally after having notified the data management function of the service event. With this mode of operation, it is possible for the console 16 to change the mode of operation automatically after completion of the service operation and testing, for example when the service engineer exits the menu, so that the LCD/keyboard is only partially enabled thereafter.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims can be formulated to such features during prosecution of this application or of any such further application derived therefrom. In particular, with reference to the appended claims, features from dependent claims can be combined with those of the independent claims and features from respective independent claims can be combined in any appropriate manner and not merely in the specific combinations enumerated in the claims.

The invention claimed is:

1. A computer system, which comprises a plurality of computer assemblies, each of which comprises:
   (i) a housing;
   (ii) a host processor located within the housing;
   (iii) a service processor located within the housing for providing system management functions within the computer assembly;
   (iv) a display that is located on the housing for displaying the status of components of the assembly obtained from the service processor; and (v) one or more manual switches located on the housing for enabling a user to vary information displayed by the display and/or to alter the status of at least one of the components;

the system including a console that can communicate with each of the assemblies and which can enable or disable the display and/or switches on any assembly either completely or in part;

wherein the console is arranged so that, when notified of a malfunction of a component of any assembly, the console will automatically enable the display and switches of that assembly only insofar as necessary to allow replacement or repair of the component and/or testing of the component, and will automatically disable the display and switches of that assembly to prevent replacement or repair and testing of the component when the console has been notified that replacement or repair and testing of the component has been effected.

2. A system as claimed in claim 1, wherein the switches of any assembly do not require authentication by a user to be operated, but the console does require authentication in order to be operated.

3. A system as claimed in claim 1, wherein the console is arranged so that, when notified of a malfunction of a component of any assembly, the console will automatically inform a data management centre of the malfunction.

4. A system as claimed in claim 1, which forms an intranet or part thereof, or forms part of the internet.

5. A system as claimed in claim 1, wherein the display and switches are operative to enable a user to run a diagnostic test on the assembly or on a component thereof.

6. A system as claimed in claim 5, wherein the display and switches are operative to list the diagnostic tests that are available and to allow a user to select a test.

7. A system as claimed in claim 1, wherein the display and switches are operative to enable a user to configure the assembly or an electronics system of which the assembly forms part.

8. A system as claimed in claim 1, wherein the display is operative to display the status of the components of the assembly as part of a menu, and the switches are operative to enable a user to navigate the menu.

9. A system as claimed in claim 1, wherein the display and/or switches are connected to the service processor via a microcontroller.

10. A system as claimed in claim 9, wherein the microcontroller is connected to a management bus to which the service processor and components of the assembly to be monitored are connected.

11. A system as claimed in claim 1, wherein the display is an alphanumeric display.

12. A system as claimed in claim 1, which includes a console interface that communicates with the service processor to enable system management functions of the assembly to be monitored and/or the status thereof to be modified from a console connected thereto.

13. A system as claimed in claim 1, which is arranged so that, when the service processor is notified of a fault in a component, the display and switches are enabled to allow a user to repair and/or test the fault.

14. A method of operating a computer system comprising a plurality of computer assemblies, each of which comprises:

(i) a housing;
(ii) a host processor located within the housing;
(iii) a service processor located within the housing for providing system management functions within the computer assembly;
(iv) a display that is located on the housing for displaying the status of components of the assembly obtained from the service processor;
(v) one or more manual switches located on the housing for enabling a user to vary information displayed by the display and/or to alter the status of at least one of the components; and
(vi) a console that can communicate with each of the assemblies and which can enable or disable the display and/or switches on any assembly either completely or in part;

wherein the console is arranged so that, when notified of a malfunction of a component of an assembly, the method further comprises automatically enabling the display and/or switches of the assembly that includes the component that has malfunctioned only insofar as necessary in order to allow the component to be repaired or replaced and to be tested, and then automatically disabling the display and/or switches of that assembly to prevent replacement or repair and testing of the component when the console has been notified that the repair or replacement and testing of the component has been effected.

15. A method as claimed in claim 14, wherein the display and switches are operative to enable a user to run a diagnostic test on the assembly or on a component thereof.

16. A method as claimed in claim 15, wherein the display and switches are operative to list the diagnostic tests that are available and to allow a user to select a test.

17. A method as claimed in claim 14, wherein the display and switches are operative to enable a user to configure the assembly or an electronics system of which the assembly forms part.

18. A method as claimed in claim 14, wherein the display is operative to display the status of the components of the assembly as part of a menu, and the switches are operative to enable a user to navigate the menu.

19. A method as claimed in claim 14, wherein the display and/or switches are connected to the service processor via a microcontroller.

20. A method as claimed in claim 19, wherein the microcontroller is connected to a management bus to which the service processor and components of the assembly to be monitored are connected.

21. A method as claimed in claim 14, wherein the display is an alphanumeric display.

22. A method as claimed in claim 14, which includes a console interface that communicates with the service processor to enable system management functions of the assembly to be monitored and/or the status thereof to be modified from a console connected thereto.

23. A method as claimed in claim 14, which is arranged so that, when the service processor is notified of a fault in a component, the display and switches are enabled to allow a user to repair and/or test the fault.

* * * * *